United States Patent
Gammenthaler

(10) Patent No.: US 7,190,882 B2
(45) Date of Patent: Mar. 13, 2007

(54) IN-CAR DIGITAL VIDEO RECORDING WITH MPEG-4 COMPRESSION FOR POLICE CRUISERS AND OTHER VEHICLES

(75) Inventor: Robert S. Gammenthaler, Princeton, TX (US)

(73) Assignee: Applied Concepts, Inc., Plano, TX (US)

( * ) Notice: Subject to any disclaimer, the term of this patent is extended or adjusted under 35 U.S.C. 154(b) by 1428 days.

(21) Appl. No.: 09/812,412

(22) Filed: Mar. 19, 2001

(65) Prior Publication Data

US 2002/0131768 A1    Sep. 19, 2002

(51) Int. Cl.
*H04N 5/91* (2006.01)

(52) U.S. Cl. .................. 386/107; 386/117; 348/143; 380/281

(58) Field of Classification Search ............... 386/1, 386/46, 107, 117; 348/143, 148; 380/23, 380/201, 281, 282, 285, 203; 360/5; 713/176, 713/194
See application file for complete search history.

(56) References Cited

U.S. PATENT DOCUMENTS

| | | | |
|---|---|---|---|
| 4,789,904 A * | 12/1988 | Peterson | ............... 386/46 |
| 4,866,438 A | 9/1989 | Knisch | |
| 4,949,186 A | 8/1990 | Peterson | |
| 5,012,335 A | 4/1991 | Cohodar | |
| 5,111,289 A | 5/1992 | Lucas et al. | |
| 5,121,200 A | 6/1992 | Choi et al. | |
| 5,225,768 A | 7/1993 | Reaves, III | |
| 5,408,330 A * | 4/1995 | Squicciarini et al. | ....... 386/107 |
| 5,491,511 A | 2/1996 | Odle | |
| 5,497,419 A | 3/1996 | Hill | |
| 5,508,736 A | 4/1996 | Cooper | |
| 5,689,442 A | 11/1997 | Swanson et al. | |
| 5,764,769 A | 6/1998 | Bennett et al. | |
| 6,028,528 A * | 2/2000 | Lorenzetti et al. | .......... 348/143 |
| 6,330,025 B1 | 12/2001 | Arazi et al. | |
| 6,389,340 B1 | 5/2002 | Rayner | |
| 6,518,881 B2 | 2/2003 | Monroe | |
| 6,606,115 B1 | 8/2003 | Alicandro et al. | |
| 6,677,858 B1 * | 1/2004 | Faris et al. | ............... 340/573.1 |
| 6,934,461 B1 * | 8/2005 | Strub et al. | ................... 386/46 |
| 6,970,183 B1 * | 11/2005 | Monroe | ...................... 348/143 |

* cited by examiner

OTHER PUBLICATIONS

U.S. Appl. No. 10/056,537, filed Feb. 23, 2005, Robert Gammenthaler.

*Primary Examiner*—James J. Groody
*Assistant Examiner*—Christopher Onuaku
(74) *Attorney, Agent, or Firm*—Scott T. Griggs; Griggs Bergen LLP

(57) ABSTRACT

An in-car video system with inputs for one or more analog or digital video cameras, one or more of which may be wireless, and having inputs for one or more microphones, one or more of which may be wireless. The system includes circuitry to digitize the input signals, if necessary, merge the data with system status data and compress the resulting data with any algorithm, preferably MPEG 4. A digital data cassette recorder records the compressed data, and a decompression circuit and active matrix display and audio channel provide monitoring capability of live video and audio. In some embodiments, a hard disk continuously records all data and archives previously recorded data to tape when so ordered to provide after-the-fact recording capability. In some embodiments, anti-tampering circuitry renders the recorded data tamper-proof, and a local playback circuit allows local playback of either live or previously recorded video.

22 Claims, 8 Drawing Sheets

IN-CAR DIGITAL VIDEO RECORDING WITH MPEG-4 COMPRESSION FOR POLICE CRUISERS AND OTHER VEHICLES

BACKGROUND OF THE INVENTION

Police cruisers have begun recording the scene outside the cruiser for evidentiary purposes for drunk driving surveillance and arrests, traffic stops and arrests, etc. Many conventional police video systems use analog VHS video tape recorders and analog video cameras. An example of such systems is U.S. Pat. No. 4,789,904 owned by Kustom Signal, Inc. This patent discloses a vehicle mounted camera and control head mounted within the police car and a video recorder housed in the trunk in a bulletproof, environmentally controlled vault. The surveillance system also includes a wireless microphone. The system is powered off the battery and may be manually or automatically activated such as when the siren and/or lights come on.

Another example of in-car video systems is U.S. Pat. No. 6,028,528 assigned to Mobile-Vision, Inc. This patent discloses an apparatus that can manage transfers of video recording media bearing machine readable registration codes. This media is adapted to record video from a vehicle-mounted camera. The management apparatus (and the methods) operate with a user identification key carrying at least one machine readable, identification code, as well as a supplemental code. The apparatus has a port for reading and writing to the key, a registration device, and a processor. The port can provide in response to the key, an identification signal and a supplemental signal corresponding to the identification and supplemental code. The registration device can read the registration codes borne by the video recording media and can provide in response thereto a registration signal. The processor is coupled to the port and the registration device for (a)producing in response to the identification signal, a selection signal signifying an instruction to transfer that one of the video recording media bearing a selected one of the registration codes without requiring an intervening user selection, (b) verifying and recording the registration signal, and (c) writing the supplemental code through the port to the identification key. The management apparatus also includes a mobile system and a station system.

The mobile system includes a video recorder, a remote port device, and a controller. The video recorder can record on the video recording media, video from the vehicle-mounted camera. The remote port device can (i) write the supplemental code to the key, and (ii) read the key and provide in response thereto, a remote identification signal corresponding to the identification code. The controller is coupled to the remote port device and the video recorder for controlling the video recorder in response to the remote identification signal.

Another example of prior art in-car video systems is U.S. Pat. No. 5,408,330 to Squicciarini, et al. and owned by CrimTec, Inc. This patent teaches a video incident capture system for law enforcement vehicles. The video incident capture system incorporates a video camera, a VHS analog video recorder, a radar unit, a real time clock, a monitor, a portable wireless microphone and its associated receiver and a system controller integrating the control of the various components to produce a comprehensive, unedited record of the incident. The system controller superimposes the target speed and patrol speed data generated by the radar unit over the video signals generated by the video camera prior to being recorded on the videotape. The portable wireless microphone permits the conversation between the law enforcement and a second party to be made part of the recorded incident. A radar interface will replace the target and/or patrol speed data with error data when an error in the operating parameters of the radar unit is detected. The system controller also provides a control function which prohibits the video recorder from recording over a previously recorded portion of the videotape when the videotape has been either rewound or fast-forwarded from the position where the prior recording was terminated. The system controller and video recorder are enclosed in a temperature controlled sealed vault mounted in the trunk of the law enforcement vehicle.

The main problem with all these prior art systems is that they do not have adequate recording time capacity to cover an entire 8-hour police shift on one tape much less a 24-hour period. There are numerous other deficiencies of these analog video tape recorder systems. For example, they are bulky and the video recorder components frequently have to be mounted in the trunk of the police car. This complicates getting the video and audio signals to them and complicates interfacing between the officer and the unit. Further, the prior art in-car video systems do not all have the ability to select from different video and audio sources such as digital video cameras, analog video cameras and in-car or wireless microphones. They do not have the ability to report the police car position, and they all do not have the ability to record the lights and siren status. They do not all have an antitampering encryption process, and they do not have the ability to copy events that have already occurred onto video tape or a mini-digital video cassette recorder from a hard disk recorder if the record mode has not been selected. They also do not have the ability to select between in-car monitoring of the live video being recorded or local playback of what has already been recorded while continuing to record live video. They also do not all have the ability to select between in-car monitoring of the live video being recorded or local playback of what has already been recorded. None of these prior art systems have the ability to play back what has already been recorded while continuing to record.

Thus, a need has arisen for an in-car video system that has higher recording capacity and is small enough to be mounted in a single unit which may be mounted in the cab of the police car. Solution of one or more of the other above noted problems would also be desirable.

SUMMARY OF THE INVENTION

The genus of the invention is characterized by the characteristic that all species will share the ability to digitize, and compress live audio signals and at least compress digital video camera output and record the compressed video and audio on a compact digital video tape recorder. In the preferred embodiment, the amount of compression and the medium size provide substantially larger amounts of record time than the prior art VHS based systems. Various species within this genus will also have hardware and/or software to solve one or more of the other problems identified above including the ability to record to tape events that have already happened and the ability to render the digital video and audio recordings tamper proof. Other species allow either analog or digital video cameras to be used and/or allow real time video playback of recorded video.

Also disclosed is a separate invention that can be used in conjunction with the first invention to tamper proof the video and audio data, but which can also be used to tamper proof any digital data. This separate invention is a genus of multiple key, multiple encryption processes where multiple key pairs are assigned to multiple different people who are unlikely to conspire to supply all their keys. All species within the genus share the following characteristics:

(1) there will be digital data of some sort that needs to be rendered tamper proof such as video and audio evidence gathered by an in-car police patrol car video surveillance system, security camera images, digital crime scene files, message traffic, etc.
(2) there will be multiple key pairs, each key pair assigned to a different person, the group of people owning the keys being a group which is highly unlikely to enter into a conspiracy together to supply all their keys, often including a judge and an evidence officer;
(3) there will be monitoring for the occurrence of any physical or electrical phenomenon or event which indicates that the data to be protected has been improperly accessed or altered;
(4) there will be multiple encryptions or multiple encryption and decryption operations using different keys either on the front end (see definition below) of the process or the back end (see definition below) or both including a species with no encryptions on the front end and triple encryptions on the back end. These encryptions and decryptions are done using the encryption and decryption keys belonging to the different people. If the event indicating possible tampering or access has occurred, a suitable tamper proofing protocol such as blocking all recording or making a notation in the data that possible tampering has occurred will be performed on the back end. The "front end" is a process that occurs one time at the time the tape is inserted into the system or just prior to the start of generation of the digital frame or frames or file to be protected. The "back end" is an encryption process that is applied to every video frame and accompanying audio data in an in-car or security camera application or performed on one or more digital files to be protected in other applications.

DETAILED DESCRIPTION OF THE PREFERRED AND ALTERNATIVE EMBODIMENTS

Figure 1:
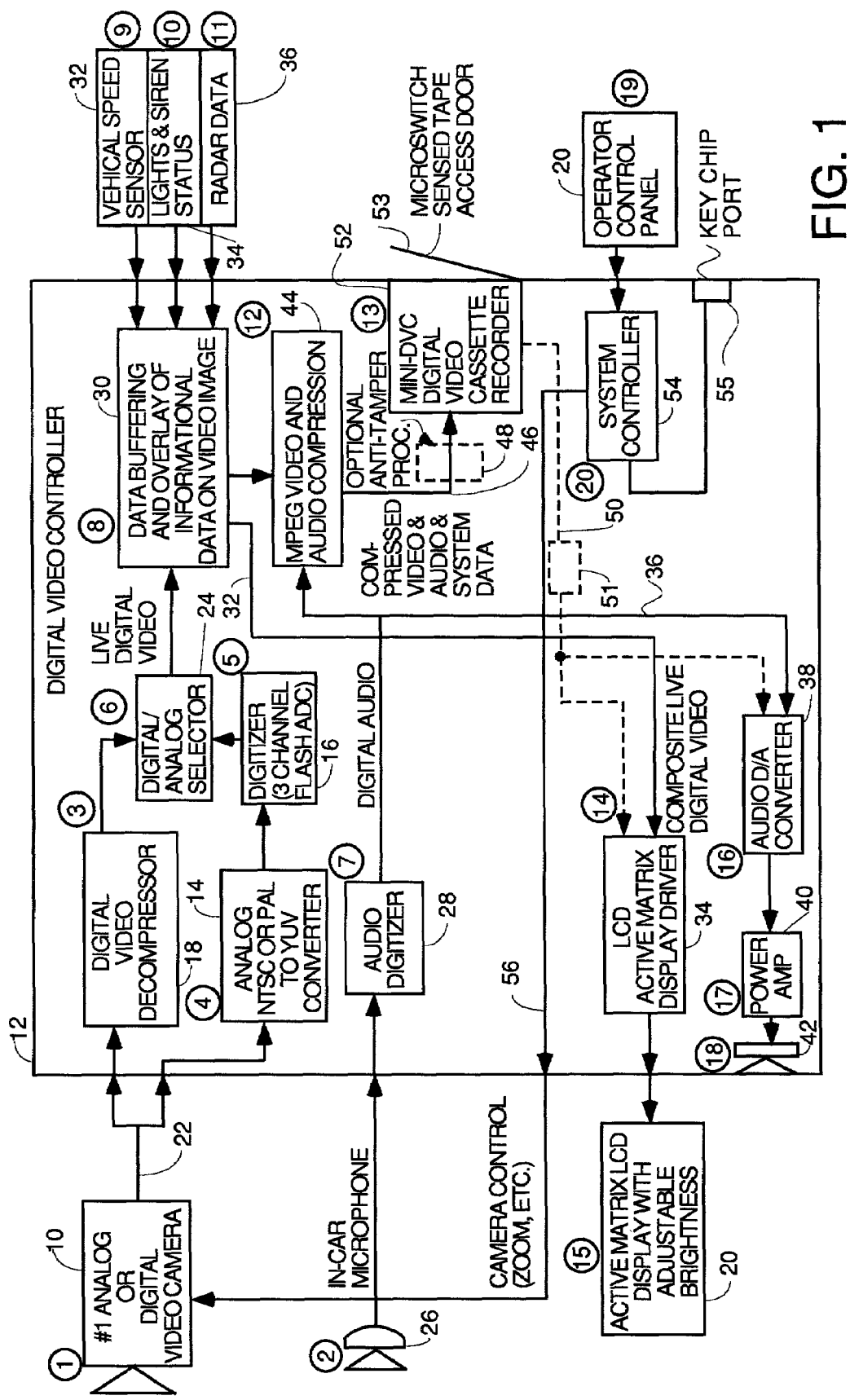
FIG. 1 is a block diagram of a basic in-car video system according to the teachings of the invention.

Referring to FIG. 1, there is shown a basic in-car video system according to one embodiment within the genus of the invention. Video camera 10, in this embodiment, can be either an NTSC or PAL format analog video camera or a digital video camera. In this embodiment, circuitry is provided in the base unit 12 to allow either type camera to be used. If a digital video camera is used, a camera with an IEEE 1394 Firewire interface is preferred. The video camera may also be a night vision video camera. Typical video cameras provide 128:1 or greater zoom, operator adjustable or automatic focus from 3 feet to infinity, adjustable shutter speed and f8 or adjustable f2 to f16 lens aperture. Typically, the video camera is mounted to the rear view mirror boom facing forward to look out the windshield. However, the video camera 10 may also be a wireless body camera worn by the officer so that when he steps out of the car, the scene he sees may be recorded.

Alternatively, the video camera 10 may be a wireless camera mounted on a helicopter although this is typically found in embodiments where there are two camera inputs and the helicopter camera is the second of two video inputs. In wireless camera embodiments, link 22 between the video camera and the base unit 12 is a wireless link. Wireless video cameras are known and are in extensive use on umpires in the National Football League and the XFL, and, in such embodiments, the base unit includes a suitable receiver, decompression circuitry if the camera is digital and NTSC to YUV converter and A/D converter if the camera is analog. Zoom and focus for any of these cameras may be remotely controllable in some embodiments by issuing commands on an operator control panel 20. The term "video camera" in the claims is intended to mean any one of these cameras.

The base unit includes circuitry to display the live video from the camera on a video display 20 so that zoom and focus setting and framing may be adjusted by the officer. Typically, the video display is an active matrix LCD display with adjustable brightness, but any type video display may be used.

In alternative embodiments, only one or the other type camera is allowed as opposed to either analog or digital hard wired types as shown in FIG. 1. In embodiments where only one type of camera is allowed, regardless of whether it is hard wired to the base unit 12 or coupled by a wireless link, the appropriate circuitry is present in the base unit for the type of camera selected. This appropriate circuitry is referred to in the claims as "means for receiving the output signal of said video camera". For example, if only an analog video camera 10 is in use, the base unit only needs an analog NTSC or PAL to YUV format converter 14 to convert the analog NTSC or PAL signal to a YUV format signal. The YUV signal is then digitized in an A/D converter 16 so as to output digital data in the same format output by decompressor 18 to put the image data into a format suitable for compression and overlay of status data. Preferably, the A/D converter is a 3 channel flash A/D. If a digital video camera is the only camera allowed, the base unit 12 includes only a digital video decompressor 18 that decompresses the lightly compressed AVI signals output by digital video cameras to output a digital format suitable for manipulation of the video image to mix in status data and suitable for compression. If a wireless camera is used, a receiver to convert the RF signals to baseband analog or compressed digital video is present along with the appropriate circuitry as described above to convert the baseband analog or digital video signal to a digital video signal suitable for compression.

If either an analog or a digital video camera may be coupled to the base unit, the base unit includes a digital/analog selector to pick the appropriate signal source of live video digital data to supply to the compression circuitry.

The embodiment of FIG. 1 also includes a microphone 26. In this embodiment, the microphone is mounted in the car so that radio traffic may be recorded as well as any sounds from outside the car which may be heard inside the car. In alternative embodiments, the microphone could be a wireless microphone worn on the body of the officer.

The base unit interfaces to the microphone via an audio digitizer 28 that functions to perform automatic gain control and digitize the audio signal of the microphone. In the case of a wireless microphone, a suitable receiver (not shown) precedes the A/D converter 28.

The live digital video is supplied to a data buffering and overlay circuit 30. Typically, this circuit is a programmed microprocessor. The function of this buffering and overlay circuit 30 is to buffer the video data for the compression process and overlay status data onto the image defined by the data stream carrying the video image data from the video camera. The status data is text and/or graphic information from other systems of interest in the arrest. For example, a speed sensor 32 provides data regarding the speed of the patrol car, lights and siren status data is provided from these systems, represented by block 34, and radar data such as the speed of the fastest and/or strongest targets detected by the radar is supplied from a police traffic surveillance radar represented by block 36. In some embodiments, a GPS receiver provides continuous position data in latitude and longitude that can also be overlaid on the image being recorded. In the embodiment of FIG. 1, overlay circuit 30 implements a process to merge this auxiliary or status data from auxiliary systems with the video image data so that, upon playback, selected items of the status data can be overlaid on the video image using known video technology. It also overlays certain items of status data onto the video image data output on line 32 for local monitoring of the video being recorded. Other types of status information that can be provided for overlay are: (1) video and audio input selections where more than one video camera and microphone are available to choose from; (2) video frame counter; (3) time of day clock; (4) vehicle ID; (5) operator ID; (6) Lidar or radar data such as locked vehicle speed, mode of operation, patrol vehicle speed as detected by radar, target distance; and (7) two-way radio status. In some alternative embodiments, the video frame count is not carried as system status data and is simply overlaid on every frame by the buffer and overlay circuit 30.

In alternative embodiments, the overlay process could also merge two video sources for recording in picture in picture or split frame format.

Another function of buffer and overlay circuit 30 is to output uncompressed video on line 32 for use by a display driver 34 in driving display 20 for real time monitoring of the video being recorded. The audio being recorded is supplied on line 36 to a D/A converter 38 for conversion back to an audio signal. This audio signal drives a power amplifier 40 which drives a speaker 42.

The video with any status data merged therein is output to an MPEG video and audio compression circuit 44. The digital audio data from A/D converter 28 is also supplied to the compression circuit. This compression circuit 44 is typically one or more digital signal processors programmed to carry out any video and audio compression process on the digital video and audio data. In the preferred embodiment, compression circuit 44 implements the MPEG-4 compression process detailed in the MPEG-4 standards which are publicly available. In fact, the complete source code for MPEG-4 compression version 1 is publicly available for 56 francs from the International Standards Organization Moving Pictures Experts Group. The MPEG-4 overview document is ISO/IECJTC1/SC29/WG11.

It is this compression along with the capacity of the digital data recording medium which gives the long recording capacity of the system. Other compression algorithms that will work to practice the invention are MPEG-2 or MPEG-1 and other lossless or lossy compression algorithms such as P×64 and JPEG.

The compressed audio and video data is output on line 46. An optional anti-tampering circuit 48 can then make the data to be recorded tamper proof. If the data is to be made tamper proof, it is necessary to include overlaid frame counter data to make sure nobody is able to remove frames or add frames. Typically, the anti-tampering circuit is simply a program in the DSP that does the compression which computes a digital signature algorithm on each frame of compressed data and then encrypts the digital signatures but not the actual video or audio data. In other words, each digital signature is encrypted (or all the digital signatures are concatenated and then encrypted) and the encrypted digital signatures are recorded along with the unencrypted video and audio data. The preferred digital signature algorithms are the known MD5 and SHA-1 algorithms which compute a digital signature on the video data defining the content of each frame and the accompanying audio. The digital signature is unique to each frame, and if either the video or audio of the frame is altered, the resulting digital signature will be altered. This is how the fidelity of the recorded video and audio to what was truly seen by the camera and heard by the microphone is guaranteed. When the video and audio is to be played back, another digital signature is calculated on each frame of video and audio using the same algorithm. If the recorded digital signature for that frame, after decryption, is not the same as the computed digital signature, somebody has altered either the video or audio of the frame or both.

By recording unencrypted video and audio data, local playback of the recorded data on display 20 is possible. Although local playback of already recorded data is not possible in the embodiment of FIG. 1, dashed line 50 represents an embodiment where unencrypted video and audio data from a digital video tape recorder 52 is supplied to an optional decompression circuit 51 for decompression and thence to the drivers 34 and 38 for local playback of previously recorded data. Driver 34 converts the digital, decompressed video data on said display 20. D/A converter 38 converts the decompressed audio data on speaker 42 through power amplifier 40.

A digital video data tape recorder 52 records the compressed video and audio data in embodiments where no anti-tamper circuit 48 is present. The tape recorder 52 provides storage of video, audio, and system data. In embodiments where an anti-tampering circuit is present, tape recorder 52 simply stores whatever data is output by the anti-tampering circuit. In one embodiment, that output data would be encrypted digital signature data and unencrypted, compressed video and audio data. In another embodiment, the data output by the anti-tampering circuit 48 would be just encrypted video and audio data. In the preferred embodiment, the recorder 52 is a mini-DVC digital video cassette recorder. In alternative embodiments, it can be any other type of digital video tape recorder. In other alternative embodiments, the DVC recorder includes a small, non-volatile memory which stores vehicle ID data, operator ID data and the date and time of each tape insertion. In an alternative embodiment, the system controller 54 or the DSP that performs the compression and encryption processes will encrypt the vehicle ID, operator ID and date and time of tape insertion data in the NVRAM in the DVC and store the encrypted version of the data in the non-volatile memory in the DVC. In the preferred embodiment, the recorder 52 will have capacity to store 24 hours of MPEG-4 compressed data.

Access to the tape compartment of the tape recorder is provided through a microswitch sensed door 53. Each time this door is opened, a microswitch senses this fact. The system controller 54 monitors this microswitch either by polling it or through an interrupt generated by circuitry connected to the microswitch or by polling a flag or register bit which is set when the door is opened. When the door 53 has been opened, an unencrypted A1 encryption key (described below) stored in the system controller 54 is erased and the anti-tamper circuit will thereafter be incapable of encrypting any data. As discussed below, other constraints may also be imposed when the A1 key has been erased which are part of an anti-tamper protocol the varieties of which will be described below.

Where the anti-tamper circuit 48 is present, the digital video tape recorder 52 records the unencrypted data if any along with the encrypted digital signature data. Secure playback in court can be accomplished by computing a digital signature on each frame recorded on the tape using the same digital signature algorithm used by the anti-tampering circuit 48 and then reversing the compression, converting the decompressed data to NTSC or PAL video signals and an audio signal and playing the signals on a TV. The digital signatures recorded on the tape are then decrypted, and the decrypted, recorded digital signatures are compared with the digital signatures computed from the frames recorded on the tape. If there is any variance, the recorded data has been tampered with and can be disregarded.

In embodiments where local playback is not implemented, such as the embodiment of FIG. 1 without the option represented by dashed line 50, the anti-tampering process 48 can operate in the same way described above or it can omit the digital signature calculations. If the digital signature calculations are omitted, the anti-tampering circuit 48 simply encrypts each frame of video data and encrypts the audio data and records the resulting encrypted data on digital video cassette recorder 52. This also renders it impossible to add, delete or alter any frame. Secure playback is accomplished by decrypting the encrypted data, decompressing it and converting it back to audio and NTSC or PAL signals for display on a TV.

However, with frame numbers overlaid and simply computing a digital signature on every frame and encrypting the digital signature, it is impossible to either add or remove frames without being detected. Further, because each frame has had a digital signature computed on it, it is also not possible to use video image manipulation software to morph any frame because this would cause the digital signature computed from the untampered frame to not match the digital signature of the morphed or altered frame thereby signalling that tampering had occurred.

In all of these tamper-proof embodiments, the decryption key is held only by the court so only the court can play back the recorded tape secure in the knowledge that no changes have been made.

The control panel 20 contains operator controls for whichever functions are implemented in the base unit. Typical operator interface mechanisms that may be included on the control panel are: push buttons; a keyboard; an LCD touchscreen; any sort of point and click device such as a trackball, mouse, joystick, touchpad, etc.; indicator lights, on-screen indicators overlaid on the video image; on-screen indicators in a virtual control panel in combination with an LCD touchscreen or point and click device.

The control panel is coupled to a system controller 54 which is coupled to every circuit in the base unit and includes a remote zoom control signal path to control zoom, focus, etc. of camera 10. The system controller 54 may also receive inputs from a remote control (not shown), and serves to control all other circuits in the base unit 12. The system controller also includes at least a frame counter and, optionally, a time of day clock. When the frames of video data are digitized, the sync interval is encoded into the resulting digital video data as a special character which can be recognized by circuitry in the buffer and merge circuit 30. Each sync interval that is recognized by the buffer and merge circuit is signalled to the system controller 54 by a frame signal on data path 55. This causes a frame counter in the system controller to be incremented. The frame count and, optionally, the time of day data are supplied to the buffer and merge circuit 30 by a data path 57 for merger into the video data stream such that this data can be overlaid upon the video data upon playback.

In embodiments where the multikey, multiencryption anti-tamper process (described below) is used, a key chip port 55 is used to to receive a key chip which contains the encryption or decryption keys needed by the system for whatever anti-tamper process is in use.

Figure 2:
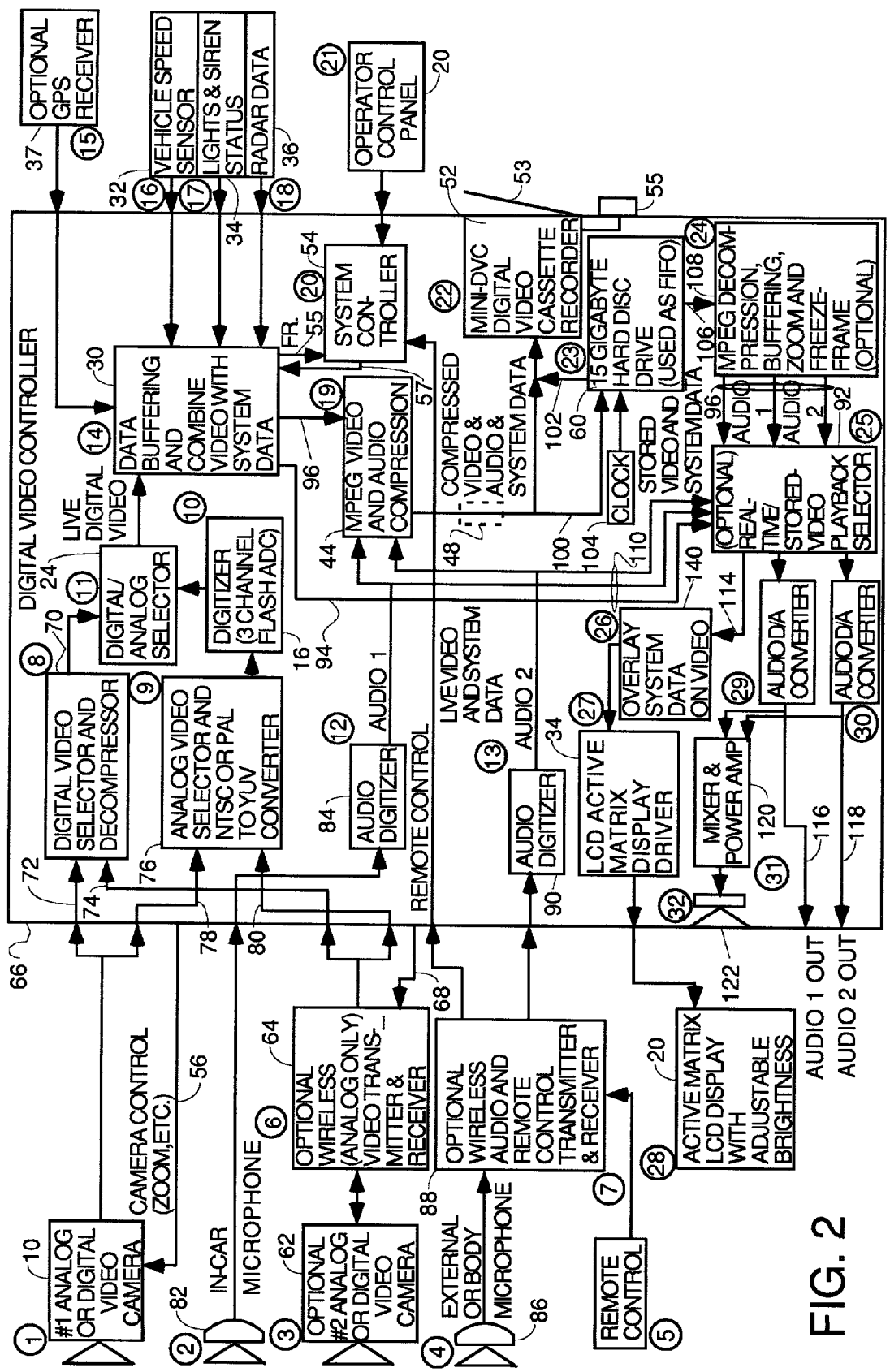
FIG. 2 is a block diagram of an in-car video system according to the invention which includes a hard drive that constantly records video and audio and which has two camera inputs and two microphone inputs and an anti-tampering option.

Referring to FIG. 2, there is shown a block diagram of an alternative, buffered embodiment of the system of FIG. 1 which has all the alternatives and optional capabilities of the embodiments described above with reference to FIG. 1. However, the embodiment of FIG. 2 has the additional capability to record after-the-fact events which the officer may have missed because the record mode was not on when the event occurred. This is provided by the use of a hard disk 60 which stores all compressed video and audio data output by the compression process or the optional anti-tampering circuit at all times regardless of whether tape recording mode is on or off. This system also has the ability to record data from either of two-different video cameras, one of which may be wireless, and either of which may be selected and the ability to record audio from either of two different microphones, one of which may be wireless, and either of which may be selected.

Video camera #1 is shown at 10 and may be either an analog or a digital video camera. Its zoom, focus and/or other features such as lens aperture, shutters speed, etc. may be controlled remotely via signals on line 56 as was the case for the embodiment of FIG. 1. Video camera #2 is shown at 62. It also may be either an analog or digital video camera, but it also may be a wireless analog or digital video camera as was the case for camera 10 in FIG. 1. The transceiver pair needed to send video data back to base unit 66 and remote control zoom, record on or off, focus, etc. commands is represented by block 64. Remote control commands from system controller 54 are sent to the camera via line 68 and the transceiver pair 64. One of the transceivers 64 is mounted on or in the base unit 66. The other is mounted in camera 62. The transceivers 64 and 88 are not restricted to receiving radio frequency carriers. They could receive any electromagnetic transmission such as modulated infrared, modulated light, microwave, ultraviolet, X-ray etc.

Digital video selector and decompressor 70 has an input from both cameras and both inputs will be active carrying digital video data if both cameras are digital. This circuit functions to receive a selection control signal from the system controller 54 and to select one of the digital video inputs 72 or 74. The lightly compressed AVI format digital video is then decompressed to put it in condition for heavy compression by an MPEG-4 process or other compression algorithm.

An analog selector and converter circuit 76 functions to receive analog video signals from cameras #1 and #2 if both cameras are analog. Circuit 76 selects between one or the other of the two analog video signals on lines 78 or 80. The selected analog signal is then converted from NTSC or PAL format to YUV format. Digitizer 16 then digitizes the YUV signal and outputs the samples to a digital or analog selector 24. The other digital video data input to selector 24 comes from selector and decompressor 70. Selector 24 selects the digital samples from A/D converter 16 or selector and decompressor 70 under control of system controller 54. It is possible that one camera is analog and one is digital. In such an embodiment, the selectors 70 and 76 make no selection and the selection of which camera's video to compress is made by selector 24.

There are also two microphones. Microphone 82 is an in-car microphone and has its signal digitized by an A/D converter 84. Microphone 86 is an external or body microphone which can be hard wired to the base unit 66 or coupled by a wireless connection using a transmitter and receiver pair represented by block 88. The audio signal from microphone 86 is digitized by A/D converter 90.

The digital audio outputs from digitizers 84 and 90 are coupled to a compression circuit 44 which has the same structure and function as the compression circuit 44 in FIG. 1. Although block 44 is labelled MPEG compression, other compression algorithms can also be used. The preferred form of compression is MPEG-4.

The digital audio outputs from digitizers 84 and 90 are also coupled to the audio inputs of an optional real time stored video playback selector 92. This circuit also has a video input 94 coupled to receive the combined, uncompressed video and merged status data from buffering and combining circuit 30. The structure and function of the buffering and merge circuit 30 is similar to its counterpart in the embodiment of FIG. 1 except in FIG. 1 it overlays the status data and in FIG. 2, it merges the status data so that selected status data from the collection of all status data that has been recorded can be merged into the image by circuit 140 for local playback.

The buffering and merge circuit 30 merges vehicle speed data, lights and siren status and radar data from interfaces 32, 34 and 36 along with GPS position data from a GPS receiver 37 with the video data selected by selector 24, and buffers the resulting composite live video data and outputs it simultaneously on line 94 for real time monitoring of the selected video. The buffered data is also made available to the video and audio compression circuit 44 via line 96 for compression along with the audio data in the same manner as in the embodiment of FIG. 1.

An optional anti-tampering circuit 48 (shown in dashed lines) tamper proofs the compressed video and audio in any one of the alternative ways described for the same circuit in FIG. 1. It outputs either compressed, unencrypted video and audio data and encrypted digital signature data or compressed and encrypted video and audio data with no digital signature data on line 100. If the anti-tampering circuit is not present, line 100 bears compressed, unencrypted video and audio data. The output data on line 100 is also coupled to the record data input of a digital video tape recorder 52 which has the same structure and alternative structures as in the embodiment of FIG. 1.

All the data on line 100 is continuously recorded on a 15 gigabyte hard drive 60 which is used as a FIFO memory. Data can be archived off the hard disk 60 to the digital video tape recorder 52 via bus 102. After the fact recording to tape can be accomplished using the system controller. If an officer wants to record to tape all the events that happened in the last 10 minutes or starting from some particular time of day he remembers to be before a significant event, he can give a command via control panel 20 to the system controller 54. Part of the data continuously recorded on hard disk 60 is time of day data supplied by clock 104 and/or a frame count signal. Although a separate clock 104 is shown, in most embodiments, the clock and/or frame counter is actually in the system controller 54 and the frame counter is incremented by the frame signal on line 55 from the data buffer and merge circuit. The time of day and/or frame count data is then supplied back to the buffer and merge circuit on bus 57 (the same thing happens in other embodiments with after-the-fact recording capability or where the frame count and/or time of day are needed such as in most tamper-proof embodiments).

By recording the time of day and/or a frame count, the data stored on hard disk 60 can be searched using the time of day or some interval data entered by the officer via control panel 20 to find the first frame that corresponds to the requested start time. Data from that frame and subsequent frames are then output by the hard disk on lines 102 and 106. The data on line 102 can be archived onto the digital tape recorder 52 when the system controller so orders. The data on line 106 can be viewed by the officer via the an optional MPEG decompression, buffering, zoom and freeze-frame circuit 108. The optional real time stored video playback selector 92 also has video and audio inputs 96 from this optional MPEG decompression, buffering, zoom and freeze-frame circuit.

The functions of the optional MPEG decompression, buffering, zoom and freeze-frame circuit 108 are to decompress the compressed data coming off the hard disk and buffer it for playback. Additional functions such as zoom and freeze-frame can also be implemented in this circuit using conventional digital video signal processsing techniques. In embodiments where the MPEG decompression, buffering, zoom and freeze-frame circuit 108 is not present, local playback of video and audio data is only of live video and audio as it is happening. In such an embodiment, there is no need for selector 92, so the live video and audio signals on bus 110 in FIG. 2 will have the video data on bus 94 applied directly to the inputs of the overlay system data on video circuit 140. The function of the overlay circuit 140 is to pick out the status data that is to be overlaid from all the status data supplied at the inputs and to overlay that status data on the video image for display. In some embodiments, the overlay circuit also receives commands from the system controller to move the overlaid data so that it does not obscure critical portions of the video image.

The function of the real-time/stored video playback selector is to select the stored video, status and audio data on lines 96 or the real time video and audio and status data on lines 110 for playback. This selection is made by the officer via control panel 20 and system controller 54. The selected video data is output on line 114 and is displayed via an active matrix display driver 34 and an active matrix display 20. The selected audio (which may contain audio from both microphones) is output on lines 116 and 118. A mixer and power amplifier 120 mixes the audio on lines 116 and 118 if both have audio signals on them and amplifies the mix and applies it to a speaker 122.

Figure 3:
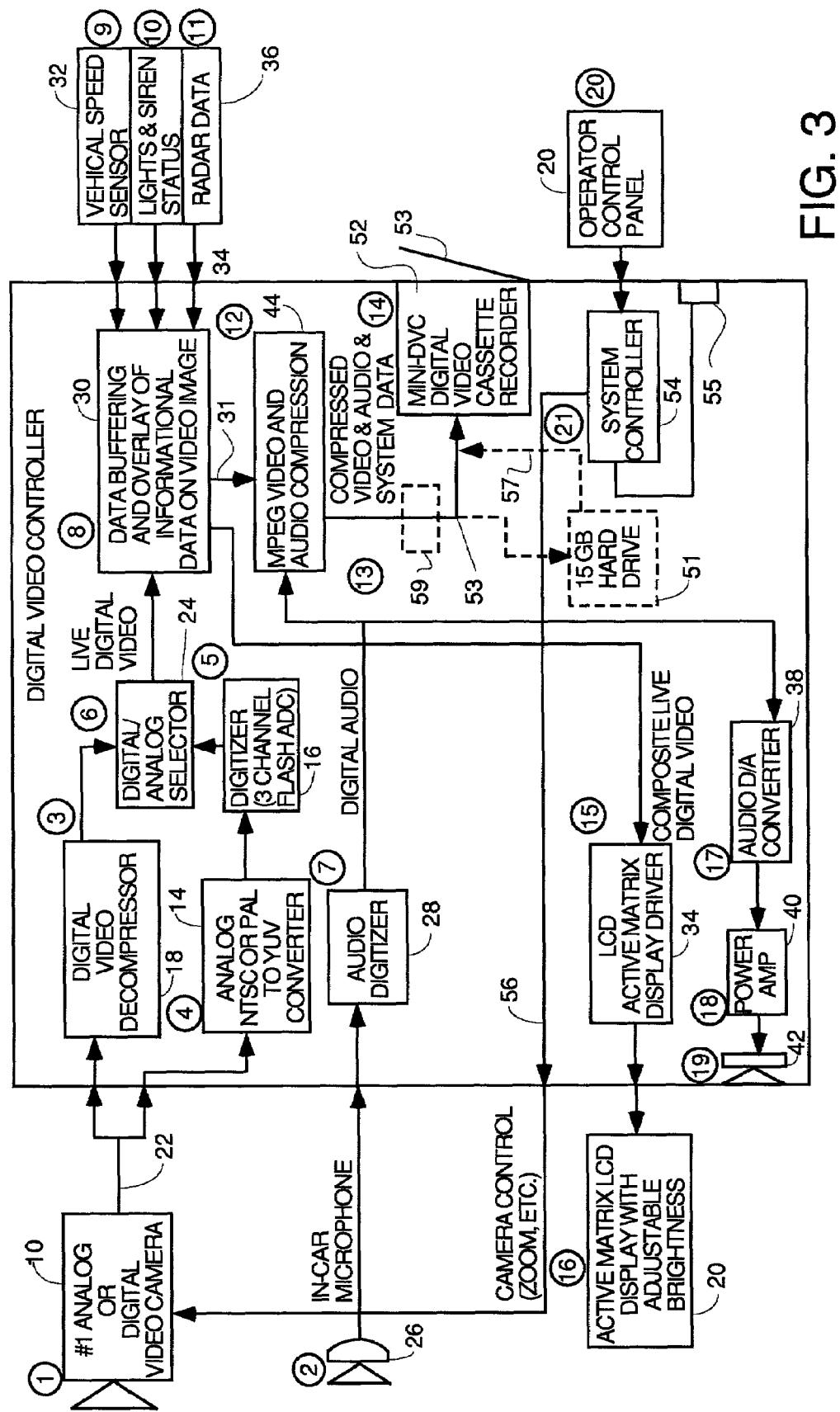
FIG. 3 is a block diagram of the basic class of embodiments represented by FIG. 1 enhanced by an optional hard drive which constantly records video and audio data and with an anti-tampering option.

Referring to FIG. 3, there is shown an alternative embodiment which is basically the same as the embodiment of FIG. 1 except that it includes an optional hard disk to continuously record the compressed composite live video and audio data output by the compression circuit 44. In this embodiment, all other circuits with the same reference number as a counterpart circuit in FIG. 1 have the same structure and function as the counterpart circuit in FIG. 1. Optionally, a hard disk 51 is included and coupled to receive and continuously record the compressed composite video, audio and system data on line 53.

The hard disk can be controlled by the system controller 55 to replay any recorded data on output 57 for archiving on tape recorder 52. As was the case for the embodiment of FIG. 2 and the anti-tampering embodiment of FIG. 1, the system controller includes a frame counter which is incremented by a frame signal output by the buffer and merge circuit 30. The frame count and, optionally, a time of data signal are supplied by the system controller 55 for merger as status data into the composite live digital video data output on line 31. This frame counter data and time of day data are recorded on the hard disk 51 with the rest of the status data. The system controller 55 can be controlled in this embodiment by the officer via control panel 20 to send a command to the hard disk 51 to cause it to playback all recorded data starting from a specific frame number or a specific time of day or going back from the present time by a specified number of minutes on output 57 to be archived by tape recorder 52. The hard disk then finds the appropriate data in any way and outputs it on line 57. In some embodiments, the hard disk has a cache memory in which frame number and time of data data are recorded along with the track and sector or block number on the hard disk where the corresponding video, audio and status data for that frame number and/or time of day were recorded. This provides an after-the-fact recording capability in case the officer did not have the in-car video system in record mode when some significant event happened. In alternative embodiments, since the hard disk 51 is used as a FIFO and will be overwritten when it reaches its capacity, the system controller can be programmed to automatically cause the digital video tape recorder to record all data on line 53 when the hard disk reaches capacity.

In a further alternative embodiment, the embodiment of FIG. 3 may include any of the anti-tampering circuits previously described, as symbolized by dashed block 59.

Figure 4:
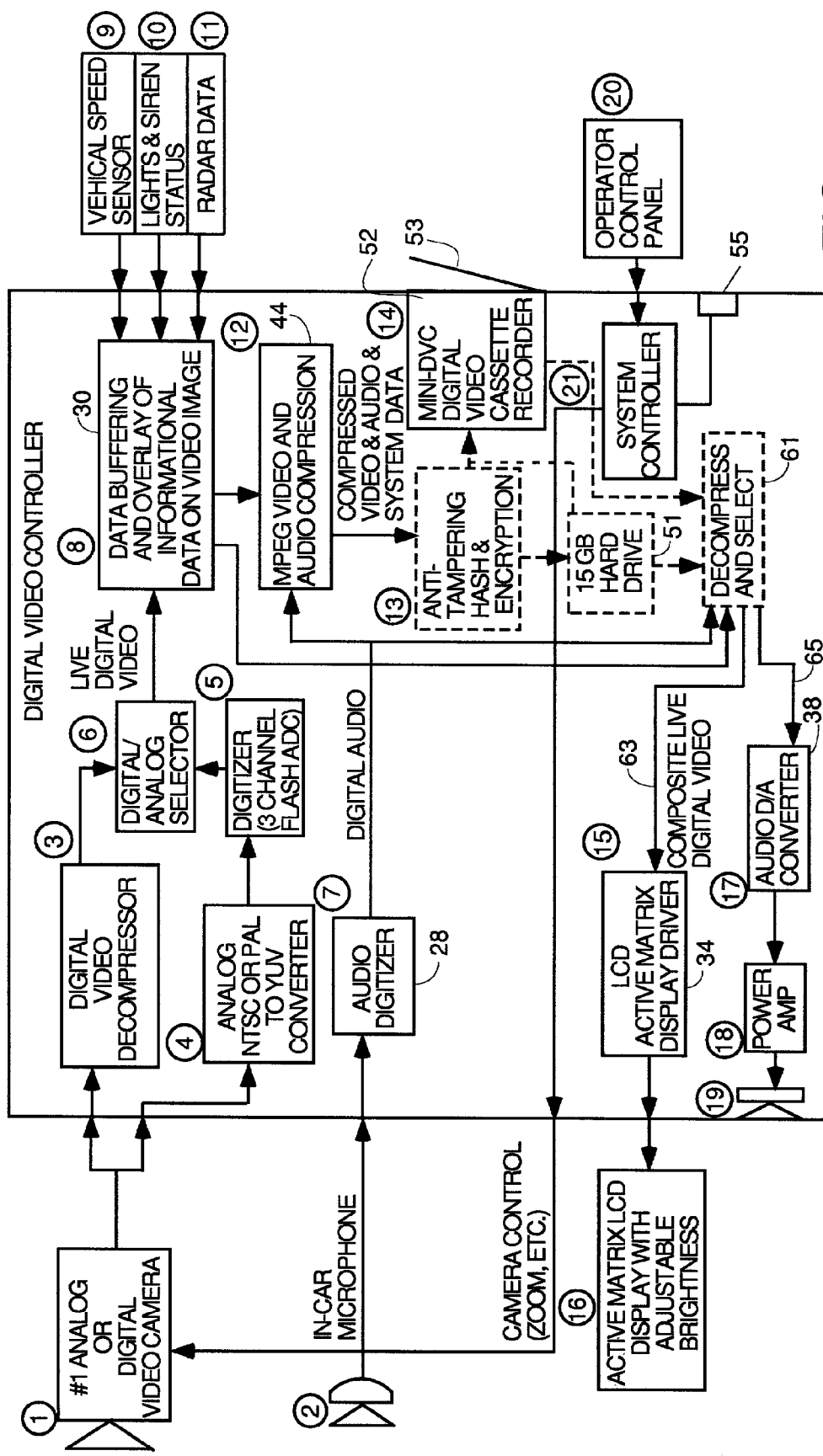
FIG. 4 is is a block diagram of the basic class of embodiments represented by FIG. 1 enhanced by an optional hard drive which constantly records video and audio data and with an anti-tampering option and an option for local playback of stored video and audio.

In still another alternative embodiment represented by FIG. 4, any of the embodiments for FIG. 3 previously described may be enhanced with an optional decompression and selection circuit 61. This circuit received compressed video, status and audio data from all of three sources: live video and audio from the buffer and merge circuit 30 and the audio digitizer 28; recorded video, status and audio data from the hard disk 51; and recorded video, status and audio data from the tape recorder 52. The decompression and selection circuit 61 selects one of these sources of data, decompresses it, and outputs the decompressed video data on line 63 to the active matrix display driver 34 and outputs the decompressed audio data on line 65 to the audio digitizer 38.

A Genus of Multiple Key, Multiple Encryption Process to Tamper-proof any Digital Data The anti-tamper embodiments described above, except for the embodiments where the digital video and audio data itself are encrypted, have a vulnerability.

To render the recorded video and audio data completely tamper proof with no vulnerability, a process from a genus of multiple key, multiple encryption processes can be used. The crux of the problem this genus of multiple key, multiple encryption processes solves is that it renders it impossible for a single person, acting alone to generate tampered, encrypted data which will decrypt in the courtroom as if it had not been tampered with. Any process that can solve this problem, is within the genus of the invention, but all species within this genus are believed to share the following common characteristics:(1) there will be digital data of some sort that needs to be rendered tamper proof such as video and audio evidence gathered by an in-car police patrol car video surveillance system, security camera images, digital crime scene files, message traffic, etc.

(2) there will be multiple key pairs, each key pair assigned to a different person, the group of people owning the keys being a group which is highly unlikely to enter into a conspiracy together, often including a judge and an evidence officer;

(3) there will be monitoring for the occurrence of any physical or electrical phenomenon or event which indicates that the data to be protected has been accessed improperly or altered;

(4) there will be multiple encryptions or multiple encryption and decryption operations either on the front end of the process or the back end or both including a species with no encryptions on the front end and triple encryptions on the back end. These encryptions and decryptions are done using the encryption and decryption keys belonging to the different people. If the event indicating possible tampering or access has occurred, a suitable tamper proofing protocol such as blocking all recording or making a notation in the data that possible tampering has occurred will be performed on the back end.

Figure 5:
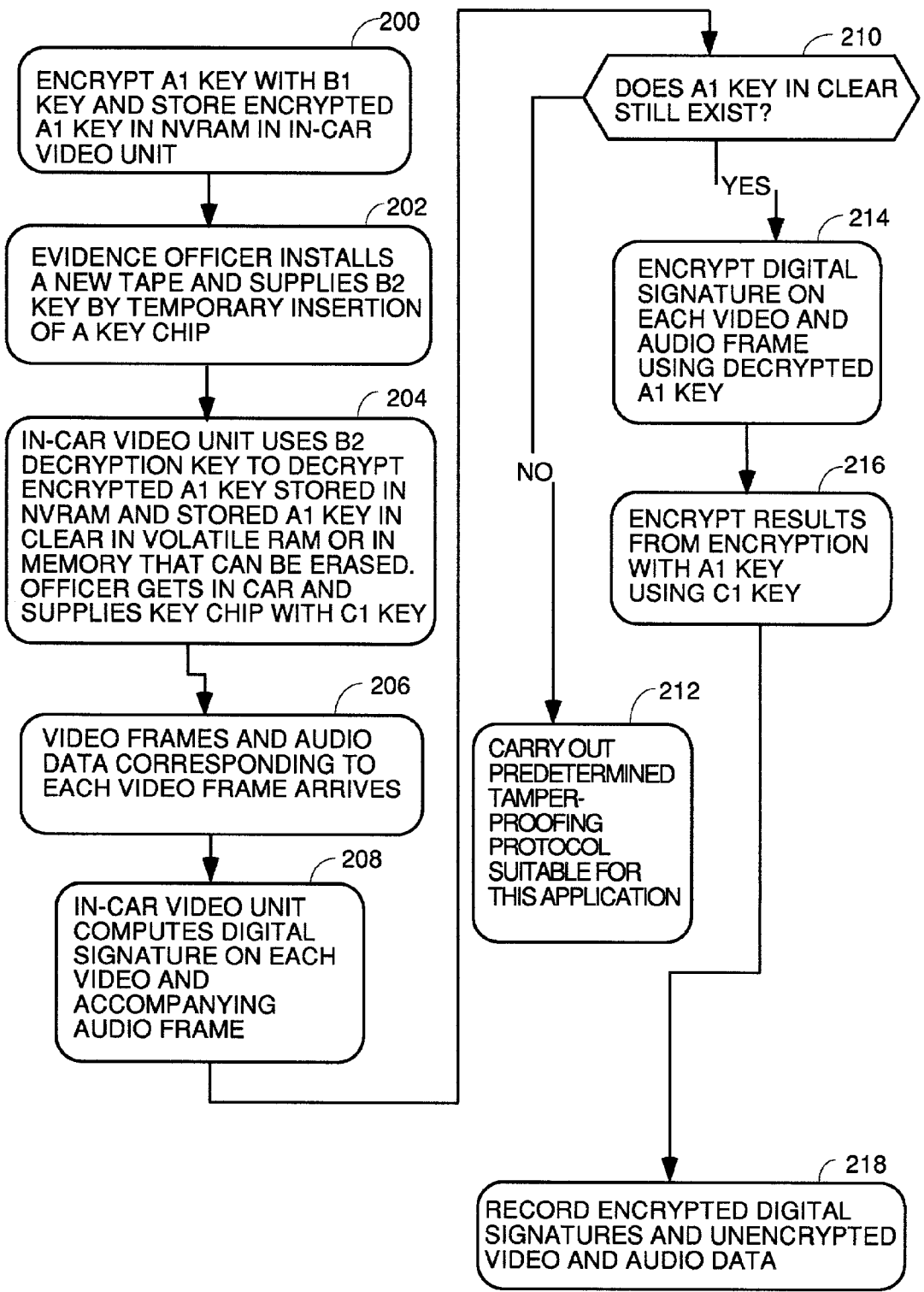
FIG. 5 is a flow diagram of a multiple key, multiple encryption species within the genus of the second invention with a single encryption and decryption of one of the back end encryption keys on the front end and double encryption using two different keys on the back end.

FIG. 5 is a flow chart showing one example of one species within this genus of processes used to protect video and audio data recorded by a police car in-car surveillance unit. In this particular example, there are three people and three key pairs. The first key pair is comprised of an encryption and decryption key pair designated A1 and A2 assigned to a judge. The second key pair is comprised of an encryption and decryption key pair designated B1 and B2 assigned to a police evidence officer. The third key pair is comprised of an encryption and decryption key pair designated C1 and C2 assigned to a particular patrolman.

The particular species represented by FIG. 5 uses a double encryption/decryption on the front end and a double encryption on the back end. Step 200 represents the process of encrypting the A1 key with the B1 key and storing the encrypted A1 key in non volatile RAM or EEPROM in the in-car video unit. Step 202 represents the process of inserting a new tape in the digital video tape recorder and supplying of the B2 key. The B2 key is the decryption key of the evidence officer. It is supplied by inserting a key chip into the key port 55 in any of the embodiments of FIGS. 1–4. The system controller can then read the B2 key from the chip. Step 204 represents the process carried out by the system controller 54 of using the B2 key to decrypt the encrypted A1 key stored in the system controller using the B2 key. The decrypted A1 key is then stored in the clear in some volatile RAM or in some memory that is automatically erased when power is disconnected to the unit or the microswitch sensed door 53 is opened for any reason. Finally, in step 204, the particular officer assigned to the car for that shift gets in the car and supplies the C1 key by plugging his key chip into the unit.

Step 206 represents the arrival of video frames and the audio data that corresponds to each video frame. In step 208, the in-car video unit anti-tamper circuit 48 computes a digital signature on each frame of video and the corresponding audio data. Test 210 represents the process of determining whether the A1 key still exists in the clear in the volatile RAM and has not been erased. If the A1 key in the clear is still present, step 214 is performed to encrypt the digital signature of each video frame and the digital signature of the audio data that corresponds to each frame using the decrypted A1 key. Step 216 represents the process of encrypting the resulting encrypted data from step 214 using the C1 encryption key of the particular officer that is driving the patrol car. This C1 key is supplied by the patrol officer at the beginning of each shift when the patrol officer inserts his key chip into the key port 55. The anti-tamper circuit 48 encrypts the results of step 214 by reading the C1 key from the chip in port 55. Step 218 represents the process of recording the double encrypted digital signature data and unencrypted video and audio data on the digital video tape recorder 52 and/or hard disk 60 if present and depending upon the particular mode of operation at the time.

Returning to test 210, if it is determined that the A1 key in the clear is no longer present, step 212 is performed. Step 212 represents the process of carrying out whatever predetermined tamper-proofing protocol that is suitable for the particular application and which is acceptable to the police department. In some embodiments, multiple different tamper-proofing protocols are pre-programmed into the system controller, and whichever one has been selected by configuration data programmed into the system by the evidence officer is performed. The possibilities for this protocol are: (1) stop encrypting the digital signatures but continue recording and enter a notation in the recorded data at the point the A1 key disappeared that any recorded data from that point forward is to be viewed with suspicion as it may have been tampered with; (2) start encrypting the digital signatures with the C1 key and make a notation of the change such that all recorded data from that point forward should be viewed with suspicion; (3) stop encrypting digital signatures and block all further recording; or (4) any other suitable anti-tampering protocol.

Figures 6, 7:
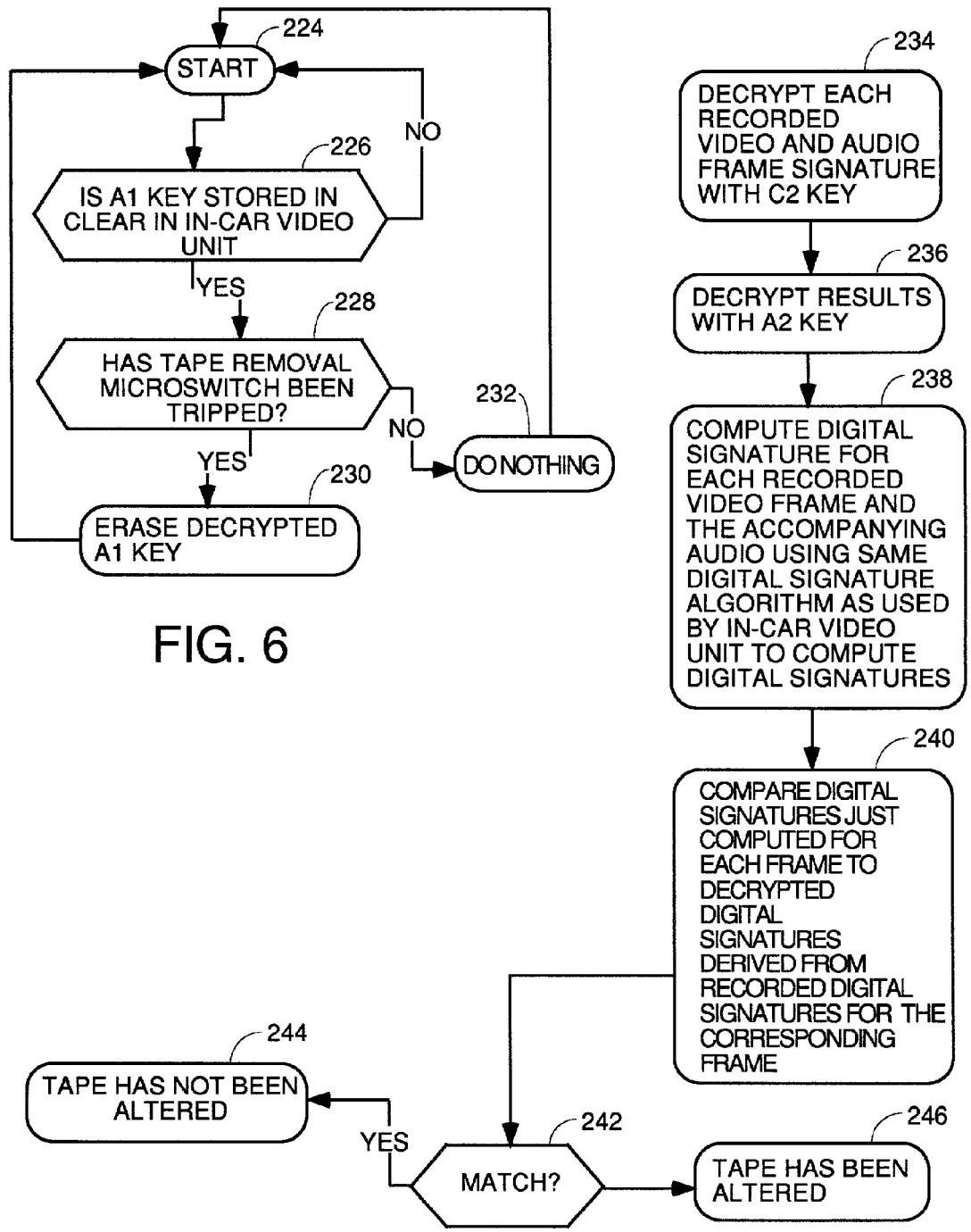
FIG. 6 is a flowchart of a process indicating how the integrity of the backend encryption keys is monitored.
FIG. 7 is a flowchart of a process of how the integrity of a double back-end encrypted file is verified.

FIG. 6 is a flowchart of the process for controlling the integrity of the A1 key by monitoring the microswitch sensed door 53. Step 224 represents the start of the process. Step 226 is a test to determine if the A1 key is stored in the clear in the in-car video unit. If not, processing returns to step 224. If the A1 key is stored in the clear, test 228 is performed to determine if the tape removal microswitch has been tripped. If it has, step 230 is performed to erase the A1 key in the clear from the volatile memory in which it is stored or to remove the power from the volatile memory in which it is stored so that it will be automatically erased (the encrypted A1 key stored in NVRAM is not erased). The A1 in the clear key should be stored in such a way that when power to the in-car video unit is disconnected such as when the unit is removed, the A1 key in the clear will be lost, and there should be no external access such that the A1 key in the clear can be accessed from the outside without removing power to the unit. If step 228 determines that the tape removal microswitch has not been tripped, step 232 is performed to do nothing and processing returns to step 224. If this tape removal microswitch is tripped, it should set a flag so that if it is not tripped when step 228 is performed, the flag will still be seen and step 230 will be performed.

FIG. 7 is a flowchart of the process of determining the authenticity of the recorded data on a tape removed from the in-car video system if the tamper proofing processing of FIGS. 5 and 6 have been used to safeguard the contents of the tape. Step 234 is the process of decrypting each recorded video frame digital signature and the accompanying audio digital signature using decryption key C2. This reverses the encryption with the C1 key performed in step 216 of FIG. 5. Step 236 decrypts the results generated in step 234 using the A2 key to reverse the encryption performed in step 214 in FIG. 5. Step 238 is the process of computing digital signatures for each recorded video frame and the accompanying audio data. This is done using the same digital signature algorithm used by the in-car video unit to compute the digital signatures that were encrypted and recorded on the tape being authenticated. Step 240 is the process of comparing the digital signatures computed in step 238 to the corresponding decrypted digital signatures computed in step 236. Step 242 represents the test to determine whether the digital signatures match. If they do, each frame for which there is a match has not been tampered with, as represented by step 244. If there is not a match for any frame, that frame has been tampered with, as represented by step 246.

Figure 8:
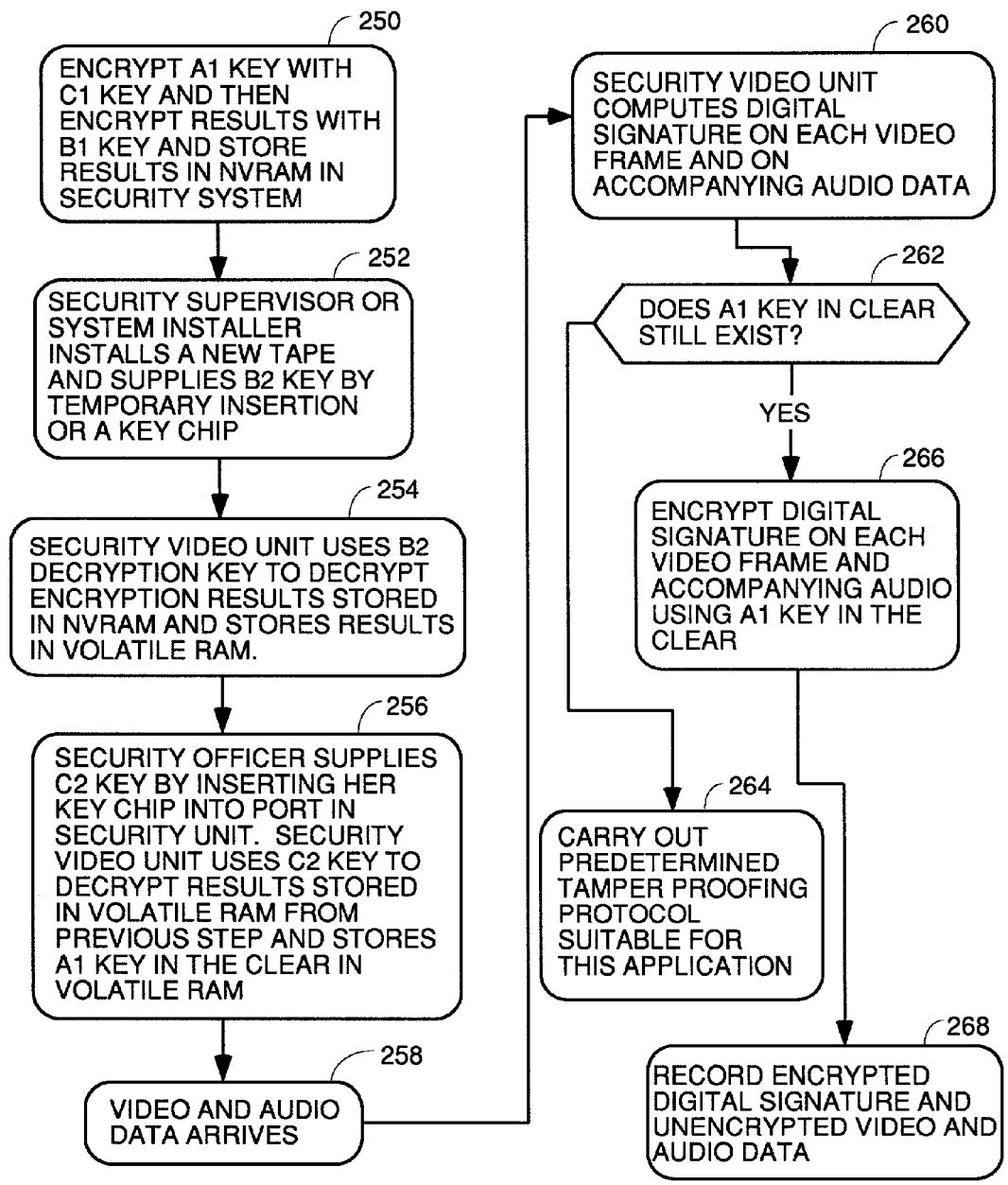
FIG. 8 is a flowchart of a process for protecting digital data using double encryption of the back end encryption key using two different encryption keys with single encryption on the back end.

The tamper proofing system of FIG. 5 is most useful in applications such as police departments where it is not clear which patrol officer will be driving any particular car on a particular day. This is the normal case since cars break, officers get sick etc. so car assignments can vary on a day to day basis. If the car assignments never vary or in other applications where there is no uncertainty as to whose C1 and C2 keys are going to be used, the process of FIG. 8 can be used. In FIG. 8, there is a triple encryption on the front end and only a single encryption on the back end, the tamper proofing protection arises from the triple encryption on the front end. The tamper proofing process of FIG. 8 is useful where there is no uncertainty as to the exact identities of the three people who will be creating, supervising or holding in evidence and using in court or for other uses a particular digital file to be protected from tampering. Such applications include securing security camera files or digital crime scene files.

Step 250 of FIG. 8 represents encrypting the A1 key with the C1 key and then encrypting those results with the B1 key and storing the results in NVRAM in the security system used to generate the digital file to be protected. In step 252, the security supervisor or system installer installs a new tape or other recording medium in the system such as ZIP drive or removable hard disk cartridge or rewritable CD (these other types of removable media may be substituted in the other embodiments disclosed herein also). When the new medium for recording is inserted, a key chip containing the B2 key of the security supervisor or system installer is inserted into the key port. This key chip will be removed when the supervisor or installer in done installing the new recording medium. Step 254 represents the process of the security video unit reading the B2 key from the chip and using it to decrypt the encryption results generated in step 250. These intermediate results generated in step 254 are stored in volatile RAM. In step 256, the security officer or other person who will be generating the digital file to be protected plugs her key chip containing the C2 key into the key port of the security video unit (the term security video unit is intended to mean any device that generates and/or records digital data of any kind, whether or not it includes video data, to be protected). The security video unit then uses the C2 key read from the key chip to decrypt the intermediate decryption results generated in step 254 to generate the A1 key in the clear. The A1 key is then stored in the clear in volatile RAM. In the embodiment of FIG. 8, the A1 key is first encrypted with the C1 key and then the results are encrypted with the B1 key. In alternative embodiments, this order can be changed so that the A1 key is encrypted with the B1 key first and then the results encrypted with the C1 key and appropriate changes are then made to to decrypt the results to arrive back at the A1 key in the clear. In the embodiment shown in FIG. 8, the decryption using the B2 and C2 keys are indicated as being done when the key chips are inserted. In alternative embodiments, the B2 and C2 keys can simply stored in memory when the key chips are inserted, and the decryptions can be done at a time when both keys are available. In this case, FIG. 6 would erase both B2 and C2 if the microswitch sensed door switch had been tripped or if any other event being monitored for improper access or tampering has occurred.

Step 258 represents the arrival of video and audio data (or any other type of digital data to be protected) forming evidence that must be rendered tamper proof. Step 260 is the process the security video unit carries out to calculate one or more digital signatures on the incoming data. If the incoming data is video frames with audio data accompanying each frame, a digital signature is calculated on each frame of video and on the audio data that accompanies each frame. Step 262 is a test to determine if the A1 key still exists in volatile RAM in the clear. If not, step 264 is performed to carry out any suitable anti-tampering protocol for this particular application. The protocols identified above may be used as well as others to give an indication that tampering may have occurred, block recording, etc. The A1 key will be automatically erased by a process similar to that of FIG. 6 if the microswitch sensed door 53 is opened. The only difference between this process and FIG. 6 is that step 230 in FIG. 6 is modified to erase not only the A1 key but also the intermediate decryption result generated in step 254 in FIG. 8.

If test 262 determines that the A1 key still exists in the clear, step 266 is performed to perform a single encryption of each digital signature computed in step 260 using the A1 key. Finally, step 268 is performed to record the encrypted digital signature data and the unencrypted data of the video frames and accompanying audio data or other digital data to be protected.

To verify that the data protected by the process of FIG. 8 has not been tampered with, a process similar to that shown in FIG. 7 is used. The only difference between the process used to verify a file protected by the process of FIG. 8 and the process of FIG. 7 is that step 234 is omitted. Thus, a process to verify the integrity of a file protected by the process of FIG. 8 comprises performing steps 236, 238, 240, 242, 244 and 246 of FIG. 7.

Figure 9:
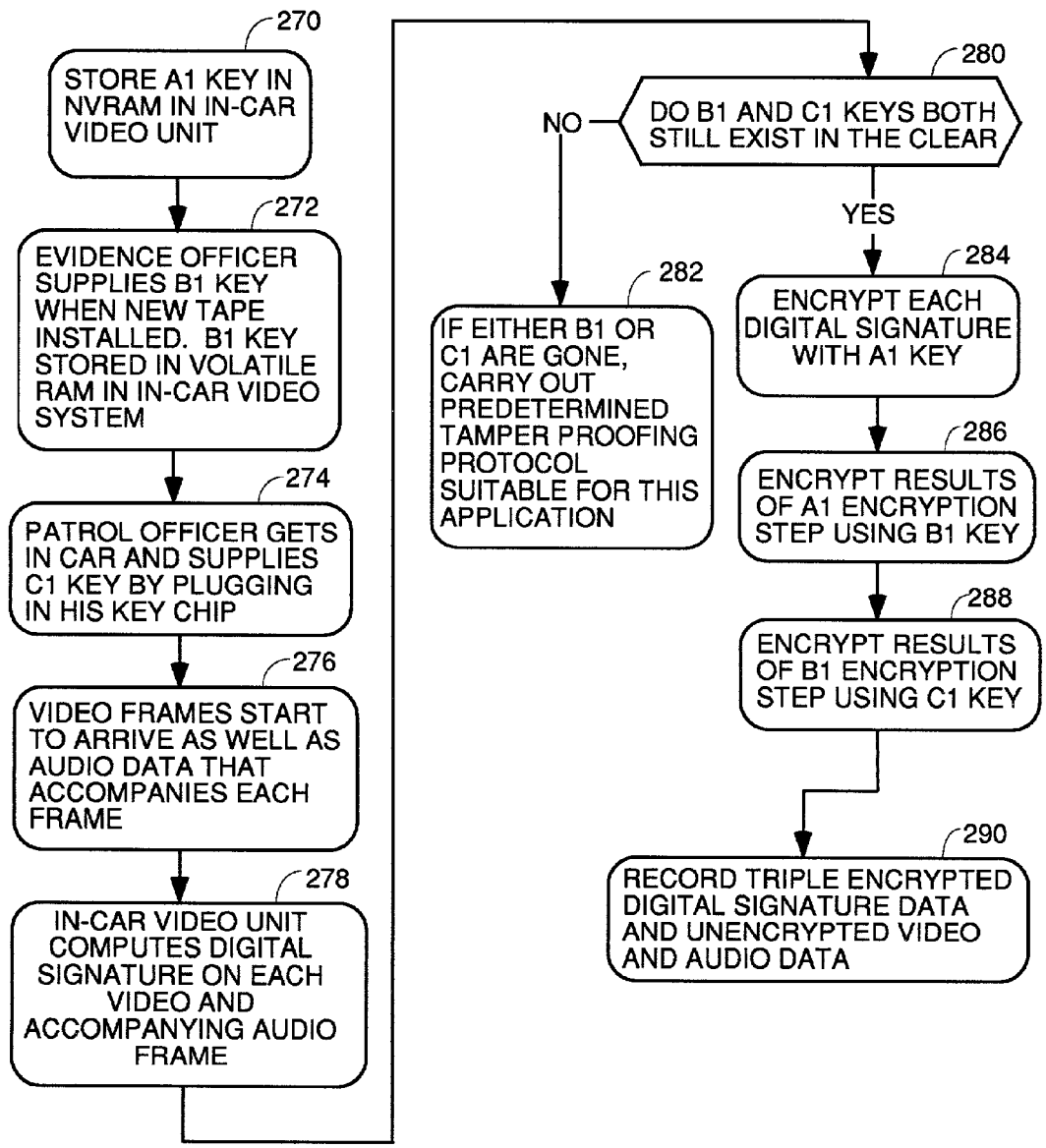
FIG. 9 is a flowchart of a process for protecting a digital file using no encryption of one of the back end encryption keys on the front end but triple encryption at the back end using three different encryption keys.

Referring to FIG. 9, there is shown a process using no encryption on the front end and triple encryption of the digital signature data on the back end. This process can be used in situations where there is uncertainty as to whose B1 and C1 keys will be used to encrypt. Step 270 represents the process of storing the A1 key in nonvolatile RAM in the in-car video unit or other security video system (again, any type system that generates and/or records digital data files to be protected can be used). Step 272 represents the process of the evidence officer supplying a new recordable medium to the in-car video unit and plugging his key chip into the key chip port. His key chip contains the B1 key, and this key is read by the in-car video unit and stored in volatile RAM. The evidence officer's key chip is then removed, and the patrol officer takes possession of the car. Step 274 represents the process of the patrol officer plugging his key chip into the key port to provide the C1 key. In step 276, video frames and the accompanying audio data (or whatever other type of digital data that is to be protected) arrives. In step 278, the in-car video unit computes a digital signature on each video frame and a signature on the accompanying audio (or computes a digital signature on whatever digital data is to be protected).

Test 280 determines if both the B1 and C1 keys still exist in the clear in volatile RAM. If either B1 or C1 is not still there, step 282 is performed to carry out whatever predetermined tamper proofing protocol is appropriate for this application. That can be stopping all recording, making a notation on the recording and continuing to record, etc. If both B1 and C1 still exist in the clear, step 284 is performed to encrypt each digital signature with the A1 key. Then step 286 is performed to encrypt the results of the encryption of step 284 using the B1 key. Then, step 288 is performed to encrypt the results generated by step 286 using the C1 key. Finally, step 290 is performed to record the triple encrypted digital signature data along with the unencrypted video and audio data (or other digital data to be protected).

A process similar to the process of FIG. 6 is used to safeguard the B1 and C1 keys in the clear. Basically, this process is the process of FIG. 6 except that step 230 erases the B1 and C1 keys if the microswitch sensed door 53 is opened.

A process similar to the process of FIG. 7 is used to verify that the data protected by the process of FIG. 9 has not been tampered with. This process is the process of FIG. 7 modified by insertion of an additional decryption step between steps 234 and 236. This additional decryption step decrypts the results obtained by step 234 using the B2 key. Step 236 in all the processes to verify the integrity of files protected with the processes of FIGS. 5, 8 and 9 results in output of the digital signature data recorded on the recording medium.

The above multiple encryption processes can also be applied to single, double or triple encrypt the compressed video and audio data or other digital data to be protected itself without the additional steps to calculate digital signatures on the data and encrypt only the signatures.

The term tamper proof data used in the claims is intended to include all the forms of tamper proof data discussed herein including single, double or triple encrypted signature data along with the unencrypted compressed video and audio data or other digital data from the signature data was calculated as well as singe, double or triple encrypted digital video and audio or other digital data of the original file and upon which no signature data was calculated.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. An apparatus comprising:
   a video camera;
   a microphone;
   a display;
   a speaker;
   an input for receiving status data;
   a base unit comprising: means for receiving the output signal of said video camera and preparing said output signal for compression;
   an analog-to-digital converter coupled to convert audio signals from said microphone to digital data;
   a buffer and merge circuit functioning to merge said status data with the frames of video data output by said means for receiving to generate composite live digital video data, and for buffering the resulting composite live digital video data and for detecting sync intervals in said frames of video data output by said means for receiving and outputting a frame signal, and for receiving at least frame number data that increments with each received frame and merging said frame number data into said composite live digital video data stream;
   a compression circuit for compressing said composite live digital video data stored in said buffer using any compression algorithm, and for compressing said audio data output by said analog-to-digital converter using any compression algorithm;
   anti-tampering means for receiving said compressed video and audio data and rendering it tamper proof;
   a digital video tape recorder or other removable medium recording device for recording whatever data is output by said anti-tampering means;
   local playback means for receiving said composite live digital video from said buffer and merge circuit and for displaying at least said video frames from said video camera along with a selected number of items of said status data on said display and for playing audio captured by said microphone on said speaker; and
   means for controlling said base unit including a frame counter for receiving said frame signal and for incrementing a frame count each time said frame signal is received and for supplying said frame count data as status data to said buffer and merge circuit.

2. The apparatus of claim 1 wherein said video camera is an analog video camera.

3. The apparatus of claim 1 wherein said video camera is a digital video camera.

4. The apparatus of claim 1 wherein said video camera is a wireless video camera, and wherein said means for receiving a signal from said video camera includes a receiver for receiving and demodulating radio frequency signals from said video camera and circuitry to develop digital video data suitable for compression from the received radio frequency signals.

5. The apparatus of claim 1 wherein said system controller also includes a clock and supplies time of day data to said buffer and merge circuit as status data, and wherein said buffer and merge circuit functions to merge said time of day data into said composite live video data stream.

6. The apparatus of claim 1 wherein means for local playback is controlled by said means for controlling as to which items of said status data are overlaid on the displayed video and wherein said means for local playback further comprises an input for receiving compressed video and audio data and said status data recorded on said digital video tape recorder and functions to decompress said video and audio data and display the decompressed video data along with zero or more items of selected status data on said display and convert said decompressed audio data to an audio signal and play it on said speaker.

7. The apparatus of claim 1 wherein means for local playback is controlled by said means for controlling as to which items of said status data are overlaid on the displayed video and wherein said means for local playback further comprises an input for receiving compressed video and audio data and said status data recorded on said digital video tape recorder and functions to decompress said video and audio data and display the decompressed video data along with zero or more items of selected status data on said display and convert said decompressed audio data to an audio signal and play it on said speaker.

8. The apparatus of claim 1 wherein said microphone is a wireless microphone and said base unit includes a receiver to receive and demodulate radio frequency signals from said wireless microphone to develop an audio signal and apply the audio signal to said analog-to-digital converter.

9. An apparatus comprising:
   a video camera;
   a microphone;
   a display;
   a speaker;
   an input for receiving status data;
   a base unit comprising: means for receiving the output signal of said video camera and preparing said output signal for compression; an analog-to-digital converter coupled to convert audio signals from said microphone to digital data;
   a buffer and merge circuit functioning to merge said status data with the frames of video data output by said means for receiving to generate composite live digital video data, and for buffering the resulting composite live digital video data, and for recognizing a sync signal in the incoming video data and outputting a frame signal, and for receiving a frame count signal and merging said frame count as status data in said composite live digital video data;
   a compression circuit for compressing said composite live digital video data stored in said buffer using any compression algorithm to generate compressed composite live digital video data, and for compressing said audio data output by said analog-to-digital converter using any compression algorithm to generate compressed audio data; a hard disk means for receiving and continuously recording said compressed composite live digital video data along with said compressed audio data, and for receiving an archive signal commanding playback of recorded data and specifying in any way at least the starting point in the stream recorded data where said playback is to begin;
   a digital video tape recorder or other removable medium digital data recording device for recording compressed data output by said hard disk means when a record signal is received; and
   control means for controlling said base unit and including at least a frame counter, said control means also coupled to receive said frame signal and for incrementing said frame counter each time said frame signal is received and for supplying said frame count to said buffer and merge circuit as status data.

10. The apparatus of claim 9 further comprising anti-tampering means coupled to receive said compressed data output by said compression means and rendering said compressed data tamper proof.

11. The apparatus of claim 9 further comprising local playback means for receiving said live digital video from said buffer and merge circuit and for displaying at least said video frames from said video camera along with a selected number of items of said status data on said display and for playing audio captured by said microphone on said speaker.

12. The apparatus of claim 9 further comprising local playback means for receiving said live digital video from said buffer and merge circuit and recorded, compressed video, status and audio data from said hard disk means or said digital video tape recorder and for selection of one source of video, status and audio data under control of said control means and for decompressing at least the selected compressed video and audio data and for displaying the decompressed video along with a selected number from zero to some larger number of items of said status data on said display and for playing audio captured by said microphone on said speaker.

13. An apparatus comprising:
one or more video inputs, each for receiving either an analog or a digital video signal and outputting a video signal;
zero or more wireless video input means for receiving either an analog or a digital video signal that is transmitted by electromagnetic transmission and for outputting a zero or more video signals;
means for selecting a video signal from any of said one or more video inputs or said zero or more wireless video inputs and appropriately preparing said video signal as digital data ready for compression, the type of preparation being dependent upon whether the video signal selected is digital or analog;
one or more audio inputs for receiving audio signals and outputting same;
zero or more wireless audio input means for receiving audio signals modulated onto an electromagnetic carrier and outputting zero or more audio signals;
means for digitizing the audio signals output by said one or more audio inputs and said zero or more wireless audio input means to generate one or more channels of digital audio data;
zero or more data paths for receiving one or more types of system status data including a time of day signal and/or a frame counter signal;
a buffer and merge circuit for receiving the digital data of the selected video signal and said status data and merging them into a live digital video stream of data which includes said status data;
compression means for receiving said live digital video stream of data and said one or more channels of digital audio data and for compressing all said data using any compression algorithm;
anti-tamper means for receiving compressed data output by said compression means and rendering it tamper proof;
a hard disk for continuously recording the compressed data output by said compression means;
a digital video cassette recorder or other removable medium digital data recording means for recording digital data, coupled to said anti-tamper means and said hard disk, for recording digital data;
controller means for receiving operator input and for controlling which video signal input is selected and which microphone input is selected and controlling said recorder means to record data directly from said anti-tamper means or data played back from said hard disk or to not record data at all and for controlling said hard disk to search for and playback data starting from a starting point designated by an operator, which can be a previously recorded time or frame, and for controlling said recorder means to record said played back data from said hard disk to provide an after-the-fact recording capability; and
playback means for providing outputs from which a video image may be derived and sound waves may be generated, said playback means having as a video and audio input either said live digital video stream of data and live audio data or previously recorded compressed video and audio data, the source of video and audio data being under control of said controller means, and providing video data and audio signals for playback thereby providing the ability to display and hear live video and audio or previously recorded video and audio.

14. A process to tamper proof digital data absent a conspiracy between more than one person holding key pairs, comprising the steps:
(1) generating digital data of any type that is to be rendered tamper proof;
(2) assigning each of a plurality of multiple encryption/decryption key pairs to a different person;
(3) calculating one or more digital signatures on the data to be protected;
(4) encrypting the encryption key of a first key pair belonging to a first person to be used to encrypt said digital signature data using the encryption key of a second key pair;
(5) having a second person temporarily supply the decryption key of said second key pair and using it to decrypt said encryption key of said first key pair and store said encryption key of said first key pair in volatile memory in the clear;
(6) monitoring for the occurrence of any physical or electrical phenomenon or event which would indicate the possibility that said digital data to be protected has been accessed improperly or tampered with;
(7) determining if said phenomenon or event has occurred indicating improper access or possible tampering;
(8) if so, erasing said encryption key of said first key pair and performing any suitable anti-tampering protocol such as blocking all access to said data to be protected, blocking all recording of said data to be protected or placing a notation in said data that it may have been tampered with or accessed improperly;
(9) if said phenomenon or event indicating improper access or possible tampering has not occurred, encrypting said digital signature data using said encryption key of said first key pair which is stored in the clear in said volatile memory and then encrypting these results with the encryption key of a third key pair.

15. The process of claim 14 further comprising the steps of recording the encrypted signature data and said data to be protected and a step for verifying that said recorded data has not been tampered with by comparison of digital signatures.

16. The process of claim 14 wherein said encryption of step 9 is of the digital data to be protected itself and not encryption of digital signature data calculated from the data to be protected, and wherein step (3) is eliminated.

17. A process to tamper proof digital data absent a conspiracy between more than one person holding key pairs, comprising the steps:
   (1) generating digital data of any type that is to be rendered tamper proof;
   (2) assigning each of a plurality of multiple encryption/decryption key pairs to a different person;
   (3) calculating one or more digital signatures on the data to be protected;
   (4) encrypting the encryption key of a first key pair belonging to a first person to be used to encrypt said digital signature data using the encryption key of a third key pair assigned to a third person and then encrypting that result with the encryption key of a second key pair assigned to a second person and storing the double encrypted result in volatile RAM;
   (5) having said second person temporarily supply the decryption key of said second key pair and using it to decrypt said double encrypted result to generate a single encrypted result and store said single encrypted result in volatile memory;
   (6) having said third person temporarily supply the decryption key of said third key pair and using it to decrypt said single encrypted result to generate an in-the-clear version of the encryption key of said first key pair, and storing same in volatile RAM;
   (7) monitoring for the occurrence of any physical or electrical phenomenon or event which would indicate the possibility that said digital data to be protected has been accessed improperly or tampered with;
   (8) determining if said phenomenon or event has occurred indicating improper access or possible tampering;
   (9) if so, erasing said encryption key of said first key pair from said volatile memory and performing any suitable anti-tampering protocol such as blocking all access to said data to be protected, blocking all recording of said data to be protected or placing a notation in said data that it may have been tampered with or accessed improperly;
   (10) if said phenomenon or event indicating improper access or possible tampering has not occurred, encrypting said digital signature data using said encryption key of said first key pair which is stored in the clear in said volatile memory.

18. The process of claim 17 further comprising a step for verifying the integrity of said data to be protected by comparison of digital signatures.

19. The process of claim 17 wherein step (3) is eliminated and wherein step (10) comprises encrypting the data to be protected itself using the encryption key of said first key pair instead of digital signature data computed therefrom.

20. A process to tamper proof digital data absent a conspiracy between more than one person holding key pairs, comprising the steps:
   (1) generating digital data of any type that is to be rendered tamper proof;
   (2) assigning each of a plurality of multiple encryption/decryption key pairs to a different person;
   (3) calculating one or more digital signatures on the data to be protected;
   (4) storing the encryption key of a first key pair belonging to a first person to be used to encrypt said digital signature data in nonvolatile RAM;
   (5) having said second person temporarily supply the encryption key of said second key pair and storing it in volatile memory;
   (6) having a third person temporarily supply the encryption key of said third key pair;
   (7) monitoring for the occurrence of any physical or electrical phenomenon or event which would indicate the possibility that said digital data to be protected has been accessed improperly or tampered with;
   (8) determining if said phenomenon or event has occurred indicating improper access or possible tampering;
   (9) if so, erasing said encryption key of said second key pair and/or said third key pair from said volatile memory and performing any suitable anti-tampering protocol such as blocking all access to said data to be protected, blocking all recording of said data to be protected or placing a notation in said data that it may have been tampered with or accessed improperly;
   (10) if said phenomenon or event indicating improper access or possible tampering has not occurred, encrypting said digital signature data using said encryption key of said first key pair and then encrypting that result using said encryption key of said second key pair, and then encrypting that result using said encryption key of said third key pair.

21. The process of claim 20 further comprising a step for verifying the integrity of said data to be protected by comparing digital signature data.

22. The process of claim 20 wherein step (3) is eliminated and step (10 comprises encrypting the actual data to be protected instead of digital signature data calculated therefrom using the encryption keys of said first, second and third key pairs.

* * * * *